Dec. 19, 1967  C. H. GRIMM  3,358,653
ROTARY INTERNAL COMBUSTION ENGINE
Filed July 18, 1966  2 Sheets-Sheet 1
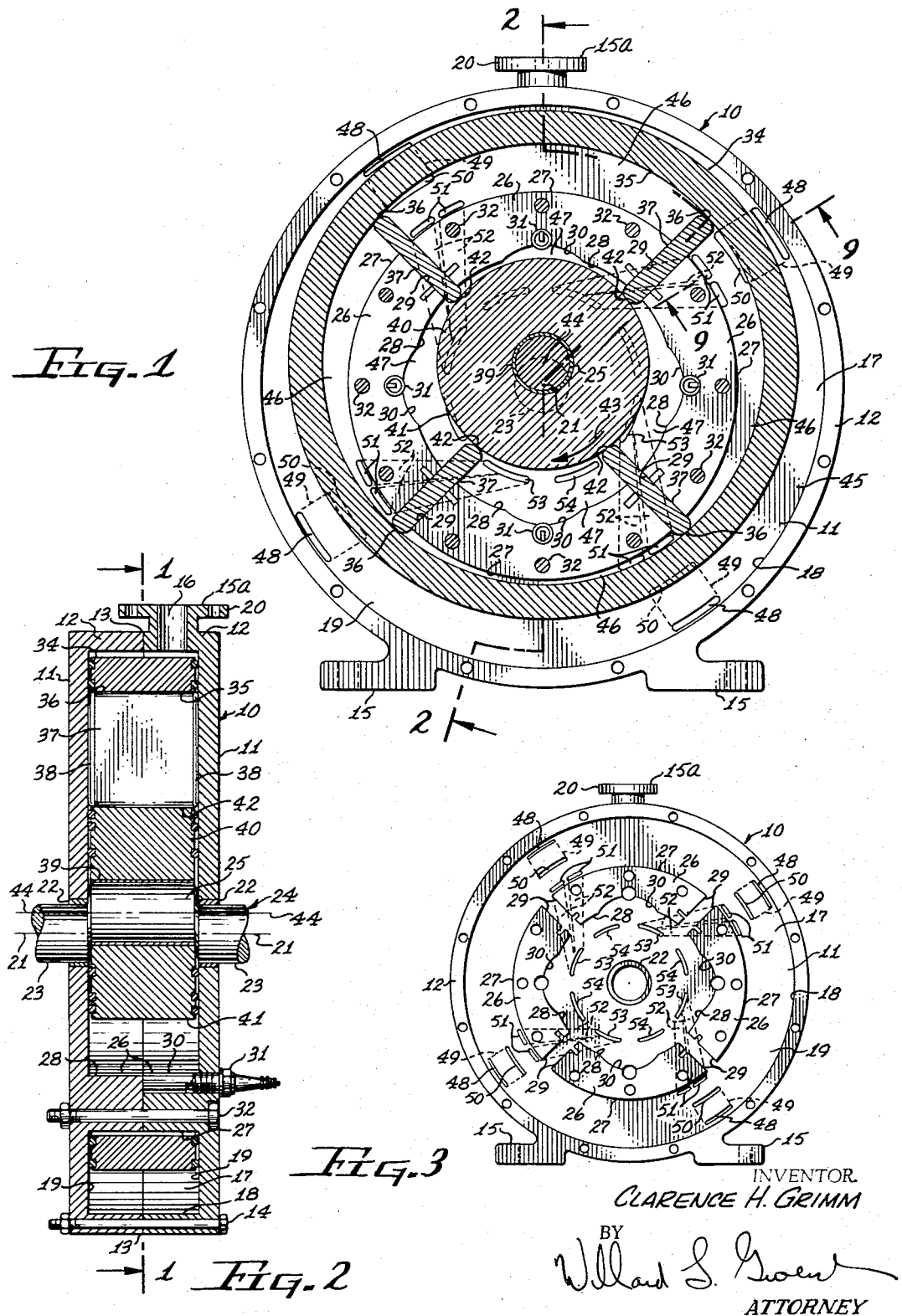
INVENTOR.
CLARENCE H. GRIMM
BY
Willard S. Groen
ATTORNEY Dec. 19, 1967  C. H. GRIMM  3,358,653
ROTARY INTERNAL COMBUSTION ENGINE
Filed July 18, 1966  2 Sheets-Sheet 2

INVENTOR.
CLARENCE H. GRIMM
BY Willard S. Groen
ATTORNEY 3,358,653
ROTARY INTERNAL COMBUSTION ENGINE
Clarence H. Grimm, 2734 E. Brill,
Phoenix, Ariz. 85008
Filed July 18, 1966, Ser. No. 566,003
3 Claims. (Cl. 123—16)

This invention pertains to improvements in rotary internal combustion engines.

One of the objects of this invention is to provide a rotary internal combustion engine characterized by a crankshaft mounter rotor having vanes held against the rotor by an outer ring in such a way that a plurality of combustion chambers are provided about the rotor utilizing the space inside the outer ring as a compression or blowing chamber to blow the old gases out and fill the combustion chamber with fresh fuel-air-oil mixture.

Still another object of this invention is to provide in the above recited engine structure an arrangement wherein the space outside the outer ring acts as an intake manifold fed by a carburetor including oil with the fuel for lubrication.

It is a further object to provide in the above described engine structure a distributor driven by the crankshaft arranged to provide ignition spark to spark plugs located in each of the recited combustion chambers.

Further features and advantages of this invention will appear from a detailed description of the drawings in which:

FIG. 1 is an enlarged radial cross-sectional view of a rotary internal combustion engine incorporating the features of this invention, indicated by the line 1—1 of FIG. 2.

FIG. 2 is an enlarged sectional view through the crankshaft axis indicated by the line 2—2 of FIG. 1.

FIG. 3 is a view similar to FIG. 1 but showing the non-moving parts of the engine.

Figure 4:
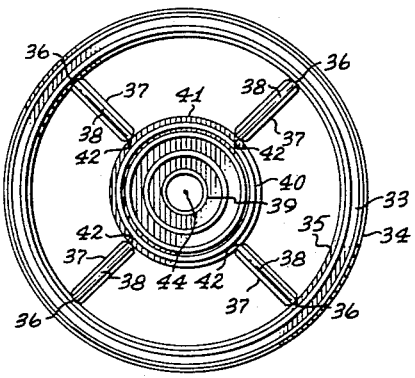
FIG. 4 is a view similar to FIG. 3 but showing the moving parts of the engine.

As an example of one embodiment of this invention there is shown a rotary internal combustion engine comprising a main housing indicated generally at 10 consisting of a pair of side plates 11 having in-turned annular ring portions 12 sealingly engaging each other at the parting line 13 and secured together by suitable bolts 14. Mounting feet 15 may be formed on the housing 10 for securing the engine in operative position on a structure to be actuated by the engine. A carburetor intake manifold connection 15a is provided on the ring portion 12 having a passageway 16 in communication with the chamber 17 defined by the bore 18 and the inside surfaces 19 of the side plates 11. A suitable flange 20 is formed on the carburetor connection 15a for mounting a suitable conventional carburetor for feeding a fuel-oil-air mixture into the intake chamber 17.

Coaxially positioned with the axis 21 of the bore 18 of the housing 10 are suitable bearings 22 supported in the side plates 11 upon which is journaled the line bearings or output shafts 23 of the crankshaft 24. An eccentric or crankpin bearing 25 is formed integral with the line bearing portions 23 extending between the inside surfaces 19 of the side plates 11. Concentrically positioned relative to the axis 21 of the line bearings 23 of the crankshaft 24 and projecting inwardly of the surfaces 19 of the side plates to the parting line 13 is the vane supporting ring segments 26 having an outer peripheral surface 27, an inner combustion chamber forming bore 28, and radially disposed vane supporting slots 29. Intermediate the slots 29 formed in the bore 28 are spark plug cavities 30 having suitable spark plugs 31 carried in the side plates 11 at each end of the spark plug cavities 30. Bolts 32 similar to the bolts 14 secured to the segments 26 together at the parting line 13.

Within the chamber 17 and slidingly engaging the surfaces 19 of the side plates 11 is the compression control ring having an outside peripheral surface 34 and an inside bore surface 35 which is engaged by the outer ends 36 of the radially movable actuating vanes 37 slidably mounted in the slots 29 for radial movement therein with the edges 38 of the vanes 37 slidingly engaging the surfaces 19 of the side plates 11. Journaled on a suitable bearing 39 and slidingly engaging the surfaces 19 of the side plates 11 is the actuating rotor 40 having a peripheral surface 41 arranged to operatively engage the inner ends 42 of the vanes 37, the rotor traveling in an orbital path 43 of the crankpin axis 44. The floating ring 33 in the chamber 17 provides an intake chamber 45 between its outer periphery 34 and the bore 18 of the housing 10. A series of circumferentially spaced variable compresion chambers 46 are formed by the ring 33 by its bore 35, the outer surface 27 of the segments 26 and the outer portions of the vanes 37. A series of corresponding circumferentially spaced variable combustion chambers 47 are formed by the bore 28 and spark plug cavities 30 of the segments 26, the peripheral surface 41 of the rotor 40 and the inner portions of the vanes 37.

A series of discharge ports 48 for the intake chamber 45 are formed in the surfaces 19 closely adjacent bore 18 of the side plates 11 and communicate through passageways 49 with the radially inwardly spaced intake ports 50. Still further radially inwardly located compression chamber discharge ports 51 are formed in the side plate surfaces 19 communicating by suitable passageways 52 with the combustion chamber intake ports 53. Exhaust ports 54 for the combustion chambers 47 open through the side plates 11 to the atmosphere.

Figure 5:
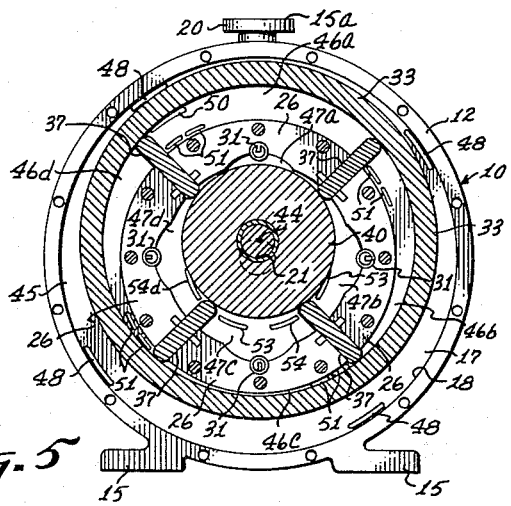
FIG. 5 is a view similar to FIG. 1 showing the position of the parts at the time of firing one of the combustion chambers.
Figure 6:
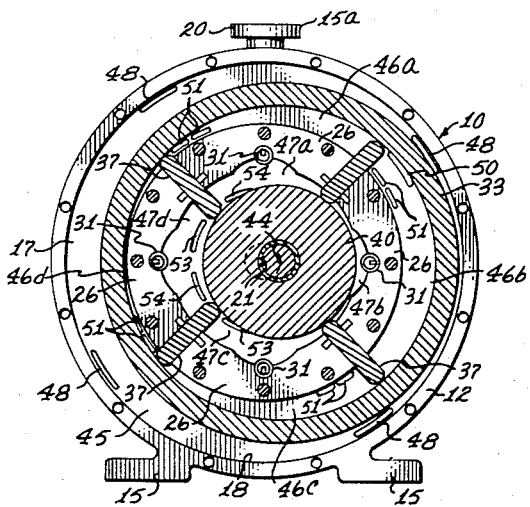
FIG. 6 is a view similar to FIG. 5 but showing the parts in the second firing position.
Figure 7:
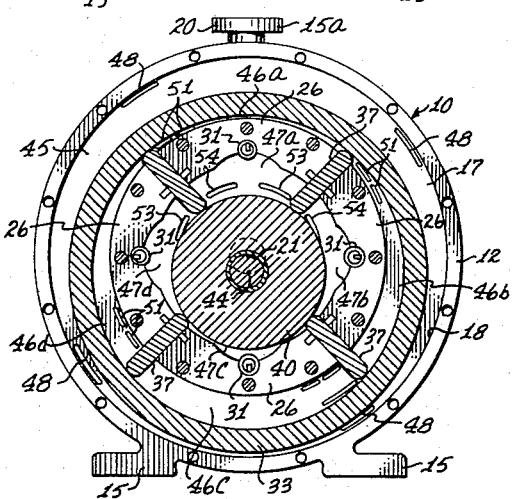
FIG. 7 is still another view showing the parts in third firing position.
Figure 8:
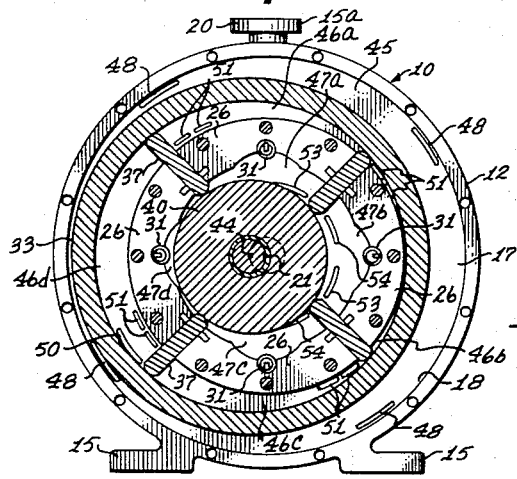
FIG. 8 is a view showing the fourth firing position of the parts of FIGS. 5–7.
Figure 9:
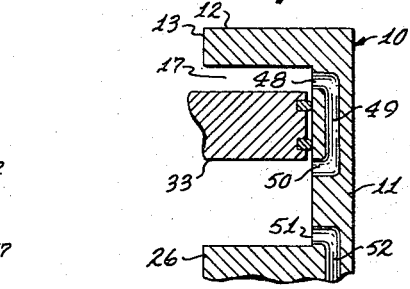
FIG. 9 is an enlarged fragmentary view on the line 9—9 of FIG. 1.

In operation: With the rotor 40 rotating clockwise and the ring 33 in top position as shown in FIGS. 1 and 5, the combustion chamber at 47a fires. The compression chamber above it at 46a has fully expanded having received a charge of fuel and air mixture from the intake chamber 17 surrounding the outside of the ring 33. The combustion chamber 47b to the right is being blown full of fuel and air by the compression chamber 46c at the bottom. The compression chamber 46b at the right is expanding drawing air and fuel from the intake chamber 45 through the porting and passageways described, the rotor 40 and the ring 33 sliding on the surfaces 19 of the side plates serving to open and close the ports 53 and 51 at the prescribed time. The combustion chamber 47c at the bottom is being blown clear of old gas by new mixture entering from the compression chamber 46d at the left. The combustion chamber 47d at the left has just opened the exhaust port 54d to release combustion pressure. FIGS. 5, 6, 7 and 8 succesively show the position of the parts for each quarter of a revolution of the engine with the operating cycle as described.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A rotary internal combustion engine comprising in combination:
    (a) a housing including an inner and an outer concentric annular chamber,
    (b) a compression control ring radially movable in said outer annular chamber forming an intake chamber on the outside of said ring and a compression chamber on the inside of ring,
    (c) a crankshaft journaled in said housing having a crankpin movable in an orbital eccentirc path within said inner annular chamber,
    (d) a plurality of circumferentially spaced radially disposed vanes slidably mounted in said housing between said inner and outer concentric annular chambers having their outer ends engaging the inside bore of said ring and their inner ends engaging said crankpin to form a plurality of related compression chambers and combustion chambers in said outer and inner annular chambers,
    (e) ports and connecting passageway in said housing communicating between said intake, compression and combustion chambers,
    (f) and means whereby the radial movement of said ring and said orbital movement of said crankpin relative to said housing opens and closes said ports in a timed sequence of operation of said engine.

2. In a rotary internal combustion engine as set forth in claim 1 wherein a source of carbureted fuel and air mixture is supplied to said intake chamber and ignition system controlled spark plugs are provided in each of said combustion chambers.

3. In a rotary internal combustion engine as set forth in claim 1 wherein said crankpin includes a rotor journaled on said crankpin having a peripheral surface in actuating contact with the inner ends of said vanes whereby said ring is actuated in radial relative movement through said vanes in synchronized orbital movement with said crankpin.

References Cited

UNITED STATES PATENTS 2,073,101 3/1939 Fox _____ 91—70 X
2,696,198 12/1954 Cushman _____ 123—16

FOREIGN PATENTS 1,376,713 9/1964 France.

RALPH D. BLAKESLEE, *Primary Examiner.*